United States Patent
Tachiwa

(10) Patent No.: US 7,567,302 B2
(45) Date of Patent: Jul. 28, 2009

(54) RECEIVING DEVICE FOR DIGITAL BROADCASTING

(75) Inventor: Wataru Tachiwa, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 740 days.

(21) Appl. No.: 11/089,800

(22) Filed: Mar. 25, 2005

(65) Prior Publication Data

US 2005/0213600 A1 Sep. 29, 2005

(30) Foreign Application Priority Data

Mar. 26, 2004 (JP) .............................. 2004-091021

(51) Int. Cl.
*H04N 5/44* (2006.01)
*H04N 5/50* (2006.01)

(52) U.S. Cl. .................. 348/725; 348/731; 348/732; 348/729; 725/38; 455/179.1

(58) Field of Classification Search ................. 348/725, 348/729, 731, 732, 720; 725/38, 40, 44, 725/50; 455/179.1, 154.1, 161.1; 370/437
See application file for complete search history.

(56) References Cited

U.S. PATENT DOCUMENTS

| | | | | |
|---|---|---|---|---|
| 6,271,893 B1 * | 8/2001 | Kawaguchi et al. | ......... | 348/725 |
| 6,337,719 B1 * | 1/2002 | Cuccia | ........................ | 348/731 |
| 7,086,076 B1 * | 8/2006 | Park | ............................. | 725/50 |
| 7,221,411 B2 * | 5/2007 | Tani et al. | .................... | 348/731 |
| 7,227,583 B2 * | 6/2007 | Sin | ............................. | 348/570 |
| 7,230,655 B2 * | 6/2007 | Nonomura | ................... | 348/734 |
| 7,281,259 B2 * | 10/2007 | Takagi et al. | .................. | 725/38 |
| 7,299,484 B2 * | 11/2007 | Thompson | ................... | 725/38 |
| 7,412,715 B2 * | 8/2008 | Kim et al. | ..................... | 725/38 |

FOREIGN PATENT DOCUMENTS

JP    P2002-374467 A    12/2002

* cited by examiner

*Primary Examiner*—David L Ometz
*Assistant Examiner*—Jean W Désir
(74) *Attorney, Agent, or Firm*—Day Pitney LLP

(57) ABSTRACT

A receiving device for digital broadcasting is provided. The receiving device is provided with a receiving system that receives a digital broadcast wave and obtains digital data based on the received digital broadcast wave, a memory that is used to store channel information regarding available channels of the digital broadcast wave, and an operation unit that is operated by a user for a channel selection operation. The receiving device is further provided with a controller that operates to obtain identification information, which corresponds to a channel selected by the user, from the channel information when the channel selection operation is performed by the user, operates to display the obtained identification information on the display regardless of whether or not the receiving system is in a busy state, and then operates to judge whether or not the receiving system is in the busy state to instruct the receiving system to receive a channel corresponding to the obtained identification information if the receiving system is not in the busy state.

17 Claims, 2 Drawing Sheets

RECEIVING DEVICE FOR DIGITAL BROADCASTING

BACKGROUND OF THE INVENTION

The present invention relates to a receiving device for digital broadcasting which provides a plurality of channels.

Recently, with the progress of digital broadcastings, the number of broadcasting channels is increasing. Also, reorganization of channels including establishment and abolishment of channels occurs frequently in the digital broadcasting in comparison with the case of analog broadcasting. It is very troublesome for a user to perform channel setting for his or her receiving device for digital broadcasting (hereafter, a receiving device for digital broadcasting is referred to as digital broadcast receiver) each time the reorganization of channels occurs.

In general, the digital broadcast receiver includes a tuner, a decoder and a controller that controls the entire operation of the receiver. The decoder has the function of decoding a broadcasting signal received by the tuner. After a user operates the receiver to conduct channel selection and information about a selected channel is inputted to the decoder, the decoder enters into a busy state to perform a receiving process for the selected channel while controlling the tuner. In the busy state, the decoder can not accept control signals from the controller.

In the conventional digital broadcast receiver, if a user conducts a channel selection operation while the decoder is in the busy state, the channel selection operation is not accepted by the receiver. Therefore, the user may have an impression that a response of the receiver is decreasing because the user operation is not accepted.

SUMMARY OF THE INVENTION

It should be noted that a conventional digital broadcast receiver does not solve the above mentioned problem that the response of the receiver decreases during the busy state of the decoder even though the receiver can update information about available channels. Such a drawback deteriorates usability of the receiver.

Them present invention is advantageous in that it provides a digital broadcast receiver configured to enhance usability of the receiver while keeping the latest information about available channel in a digital broadcast.

According to an aspect of the present invention, there is provided a receiving device for digital broadcasting which is provided with a receiving system that receives a digital broadcast wave and obtains digital data based on the received digital broadcast wave, a memory that is used to store channel information regarding available channels of the digital broadcast wave, and an operation unit that is operated by a user for a channel selection operation. The receiving device is further provided with a controller that operates to obtain identification information, which corresponds to a channel selected by the user, from the channel information when the channel selection operation is performed by the user, operates to display the obtained identification information on the display regardless of whether or not the receiving system is in a busy state, and then operates to judge whether or not the receiving system is in the busy state to instruct the receiving system to receive a channel corresponding to the obtained identification information if the receiving system is not in the busy state.

With this configuration a channel number selected by a user is displayed on the display even if the receiving system is in the busy mode, and the channel being displayed is received immediately after the busy state is finished. Therefore, it becomes possible to enhance usability of the receiving device while keeping the channel information up to date Optionally, the receiving device may include a channel information updating system that updates, at a predetermined time, the channel information stored in the memory based on the digital data obtained by the receiving system, a display on which information regarding a channel is displayed, Optionally, if the digital broadcast wave is configured to include a plurality of channels in a single frequency, the digital data obtained by the receiving system may include the channel information regarding the plurality of channels in the received digital broadcast wave.

Still optionally, the channel information updating system may operate to update the channel information in the memory if the channel selection operation is not performed by the user and the receiving system is not in the busy state.

Still optionally, the channel information updating system may operate to repeatedly judge whether the channel selection operation is not performed by the user and the receiving system is not in the busy state, and may operate to update the channel formation with regard to a predetermined number of channels if it is judged that the channel selection operation is not performed by the user and the receiving system is not in the busy state.

Still optionally, if the digital broadcast wave is configured to include a plurality of channels in a plurality of frequencies, respectively, the receiving system may operate to detect a guard interval period in the digital broadcast wave. In this case, the channel information updating system may instruct the receiving system to make a search for channels having frequencies other than a frequency currently received during the guard interval period so as to update the channel information in the memory base on a result of the search.

In a particular case, the memory may be a RAM.

In a particular the channel information may be stored in the memory as a table containing an available channel number.

In a particular case, the table may include data concerning contents of the available channel number.

In a particular case, the operation unit may be configured to accept an operation for incrementing a channel number to be selected and an operation for decrementing a channel number to be selected.

In a particular case, the digital broadcast wave may be a digital broadcast provided by broadcast satellites.

According to another aspect of the present invention, there is provided a method of in setting channels in a receiving device for digital broadcasting. The method includes the steps of detecting a channel selection operation through use of an operation unit, obtaining identification information, which corresponds to a channel selected by the channel selection operation, from the channel information obtained by a receiving unit when the channel selection operation is detected, and displaying the obtained identification information on a display regardless of whether or not the receiving unit is in a busy state, The method further includes judging whether or not the receiving unit is in the busy state, and instructing the receiving unit to receive a channel corresponding to the obtained identification information if it is judged that the receiving unit is not in the busy states.

With this configuration, a channel number selected by a user is displayed on the display even if the receiving unit is in the busy mode, and the channel being displayed is received immediately after the busy state is finished. Therefore, it becomes possible to enhance usability of the receiving device while keeping the channel information up to date.

Optionally, the method may include updating, at a predetermined time, the channel information based on digital data obtained by the receiving unit.

Still Optionally, the step of updating is conducted if the channel selection operation is not detected and the receiving unit is not in the busy state.

The device and method according to the present invention can be realized when appropriate programs are provided and executed by a computer. Such programs may be stored in recording medium such as a flexible disk, CD-ROM memory cards and the like and distributed. Alternatively or optionally, such programs can be distributed through networks such as the Internet.

BRIEF DESCRIPTION OF THE
ACCOMPANYING DRAWINGS

DETAILED DESCRIPTION OF THE
EMBODIMENTS

Hereafter, an embodiment according to the invention will be described with reference to the accompanying drawings.

Figures 1, 2A, 2B:
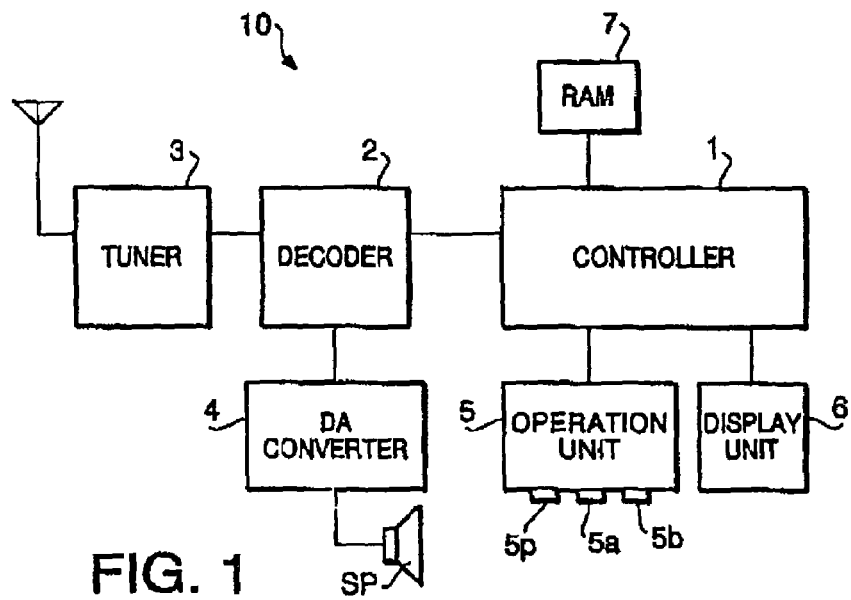
FIG. 1 is a block diagram illustrating a control system of a digital broadcast receiver according to an embodiment of the invention FIG 2A show an example of a channel table stored in a RAM.
FIG. 2B shows an example of an updated channel table stored in the RAM.

FIG. 1 is a block diagram illustrating a control system of a digital broadcast receiver 10 according to an embodiment of the invention. The receiver 10 is configured to receive a signal of digital broadcasting provided by broadcast satellites. In this embodiment, the digital broadcasting is characterized in that it has a plurality of channels in a single frequency. As shown in FIG. 1, the receiver 10 includes a controller 1, a decoder 2, a tuner 3, a digital-to-analog (DA) converter 4, an operation unit 5, a display unit 6, a RAM (random access memory) 7, and a speaker SP.

The controller 1 controls entirely the receiver 10 and performs various functions that the receiver 10 has. The decoder 2 decodes a broadcasting signal received by the tuner 3 to demodulate the broadcast signal. The DA converter 4 converts sound data obtained by the decoder 2 into an analog sound signal. The analog sound signal generated by the DA converter 4 is then outputted through the speaker SP. The display unit 6 includes a display on which various types of information concerning operations of the receiver. The information displayed by the display unit 6 includes channel information (e.g. channel number) about a channel selected by a user.

The RAM 7 is used as a work memory by the controller 1. One example of data stored in the RAM 7 is a channel table listing information of all the channels contained in one frequency (one broadcasting signal). Fig 2A shows an sample of the channel table stored in the RAM 7. The controller 1 creates and uses the channel table for performing a receiving operation described later. As shown in FIG. 2A, the channel table contains data indicating whether each channel is available or not.

The decoder 2 has the function of monitoring information concerning a channel status of all the channels in the broadcasting signal. Such information is periodically included in the broadcasting signal by a broadcast station. The controller 1 receives the information concerning the channel status from the decoder 2 at a predetermined time to update the channel table in the RAM 7. That is, the controller 1 keeps the channel table in the RAM 7 up to date.

The operation unit 5 includes a plurality of buttons including an up-button 5a, a down-button 5b and a power button 5p. The up-button 5a and the down button 5b are used to perform channel selection. By pressing the up-button one time, a next channel is selected. By pressing the down-button one time, a previous channel is selected. When the user operates one of buttons of the operation unit 5, the operation unit 5 provides a signal indicating user operation for the controller 1.

Figure 3:
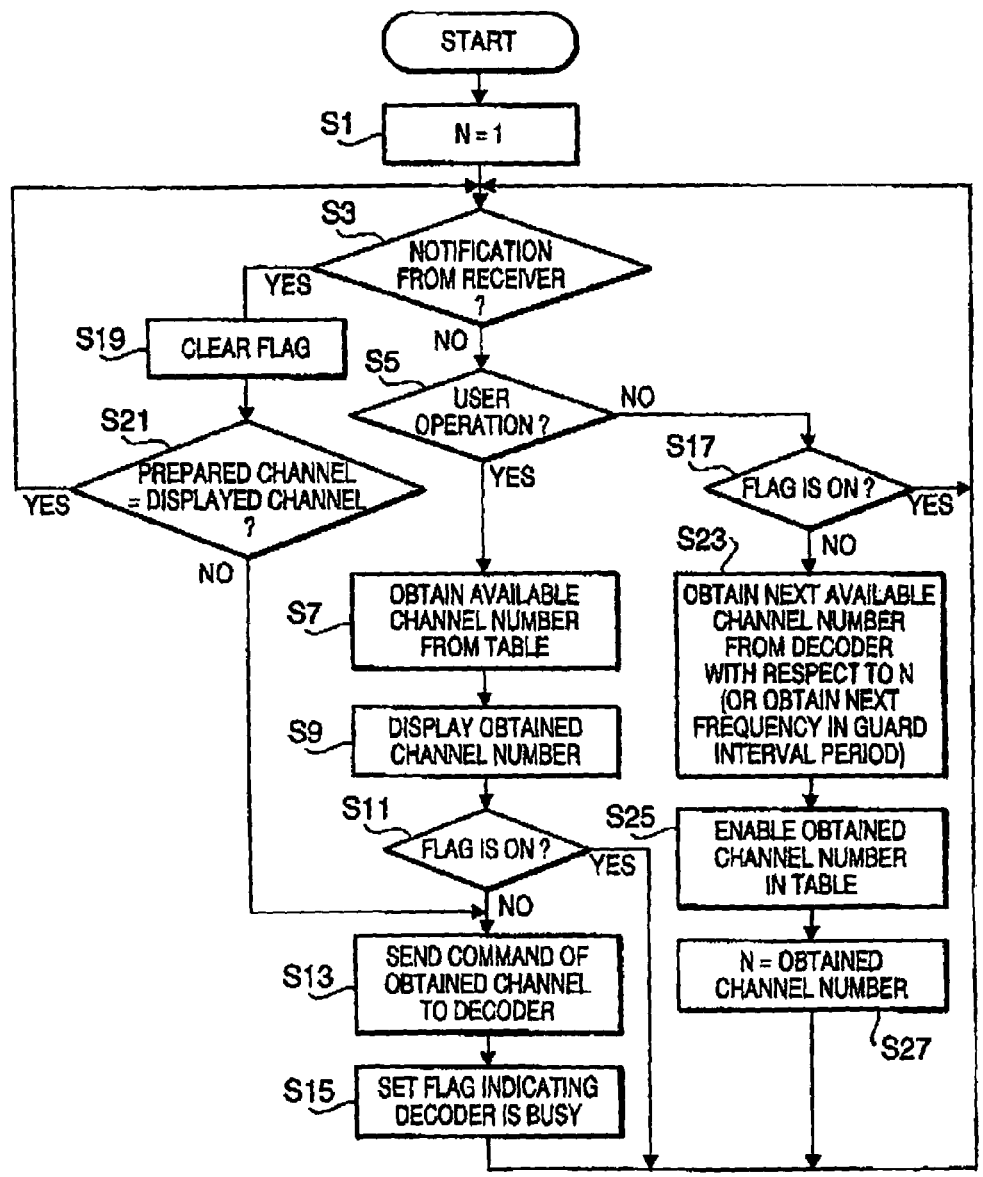
FIG. 3 is a flowchart illustrating a receiving operation of the receiver.

Next, the receiving operation performed under control of the controller 1 will be explained in detail FIG. 3 is a flowchart illustrating the receiving operation of the receiver 10. The receiving operation is broadly divided into a channel setting process and a table updating process. The channel setting process is a process for setting (switching) a channel to be received by the receiver 10 in response to user operation. The table updating process is a process for keeping the channel table in the RAM 7 up to date. As described in detail below, the channel setting process and the table updating process are selectively executed in a flow of the receiving operation shown in FIG. 3.

(Channel Setting Process)

Firstly, the channel setting process is explained. If power of the receiver 1 is turned ON by use of the power button 5p, the controller 1 an initial number (channel 1 in this embodiment) to a variable N (hereafter, referred to as a channel number N) which is a reference number used for the table updating process. It should be noted that the channel number N initialized at step S1 may be different from a channel number selected by a user in a channel setting operation conducted during the following steps. Next control proceeds to step S3.

In step S3, it is judged whether or not the controller 1 receives a notification indicating completion of channel setting (hereafter, referred to as a channel setting completion notification) from the decoder 2. In the case where step S3 is executed immediately after power is turned to ON, the channel setting completion notification is not received in step S3. Then, control proceeds to step S5.

In step S5, the controller 1 judges whether or not a channel selection operation is conducted by a user by use of the up-button 5a and down-button 5b. If the user conducted the channel selection operation (S5:YES), control proceeds to step S7.

In step S7, the controller 1 obtains a channel number of an available channel in accordance with the channel selection operation conducted by the user. More specifically, the controller 1 judges whether a signal from the operation unit 5 indicates pressing operation for the up-button 5a or pressing operation for the down button 5b. That is, the controller 1 judges whether the channel selection operation is an operation for selecting a next channel with respect to a channel being received or an operation for selecting a previous channel. For example, if the user pusses down the up-button 5a while a channel being received is channel 4 (hereafter, this user operation is referred to as a first user selection operation), the controller 1 consults the channel table in RAM 7 shown in FIG. 2A and obtains a channel number 8 as a next channel because, according to the channel table shown in FIG. 2A, an available channel next to the channel 4 is channel 8.

Next, in step S9, the controller 1 controls the display unit 6 to display the channel number obtained in step S7. Next, in step S11, the controller judges whither or not a flag is ON. The flag is used as a status of the decoder 2 for indicating that the decode 2 is in a channel setting mode, In the case where step S3 is executed immediately after power is turned to ON. The flag is not ON. Therefore, in this case, control proceeds to step S13.

In step S13, the controller sends a channel setting command to the decoder 2 so as to instruct the decoder 2 to receive a broadcast of the available channel obtain step S7. After sending the channel setting command, the control 1 sets the flag so as to indicate that the decoder 2 is in the setting mode (step S15). Then, control returns to step S3.

As long as the decoder 2 is in the channel setting mode, and the user does not conduct the channel selection operation, a sequence of steps S3, S5, and S17 is repeated If the controller 1 receives the channel setting completion notification from the decode 2, a result of judgment in step S3 becomes "YES", and control gets away from the sequence of stop S3, S5, and S17, Then, the controller 1 clears the flag which has been set to 1 in step S15 (step S19).

Next, in step S21, the controller 1 judges whether the channel number for which the decoder 2 is ready for receiving is equal to the channel number displayed on the display unit 6 (i.e. The channel number selected by the user operation). If control gets away from the sequence of steps S3, S5 and S17 at step S3 toward step S19 without performing a next user selection operation (i.e. if the channel number displayed on the display unit 6 remains at channel 8), the channel number (i.e. channel 8) for which the decoder 2 is ready for receiving is equal to the channel number (i.e. channel 8) displayed on the display unit 6. In this case, control returns to step S3 and thereby the controller 1 finishes the channel setting process for channel 8.

If a next user selection operation is performed during the sequence of steps S3, S5, and S17 is repeated, control proceeds to step S7 from step S5 to execute the above mentioned steps S7 and S9. For example, if the user pushes down the up-button 5a again while viewing the indication of channel "8" on the display of the display unit 6, a channel number 9, which is a next available channel as indicated in the channel table shown in FIG. 2A, is displayed on the display of the display unit 9.

Next, the controller 1 judges whether the flag is ON or not (S11). If the decoder 2 is still in the channel setting mode for channel 8 selected in the first user selection operation, the controller determines that the flag remains ON (S11:YES), and therefore control returns to step S3 from step S11.

Until the completion of the channel setting mode for channel 8, a sequence of steps S3, S5 and S17 or a sequence of steps S3, S5, S7, S9 and S11 is performed depending an whether a further user selection operation is conducted or not. That is, if a user performs a further user selection operation while viewing an indication of channel "9" on the display, a result of judgment of Step S5 becomes "YES", and therefore steps S7, S9 and S11 are executed if a user does not perform a further user selection operation, a result of judgment of step S5 becomes "NO", and therefore step S17 is executed.

If the controller 1 receives the channel setting completion notification, a result of judgment in step S3 becomes "YES", and step S21 is executed after the flag is cleared in step S19. Because the channel which the decoder 2 is now ready for receiving is channel 8, and the channel being displayed on the display (i.e. The channel selected by a further user selection operation is channel "9"), a result of judgment is step S21 becomes "NO", and therefore steps S13 and S15 arc executed. In this case, the controller 1 instructs the decoder 2 to receive a broadcast of the channel 9.

As described above, the channel number selected by a user is immediately displayed on the display of the display unit 6, and therefore the user can check the channel number that the user inputted through use of the operation unit 5 immediately after completion of the user selection operation. Therefore, usability including responsibility and comfort with regard to a user operation is enhanced (Table Updating Process)

Next, a table updating process is explained with reference to FIG. 3. The decoder 2 is configured to obtain channel information from a broadcasting signal, for example, when power of the decoder 2 is turned ON. The controller 1 obtains the channel information from the decoder 2 and stores the channel information into the RAM 7. Such a list updating process starts if the user selection operation is not performed and the decoder 2 is not in a busy state (i.e. if conditions S5:NO and S17:NO bold).

If it is determined in step S17 that, the flag is not ON (S17:NO), the controller 1 information regarding a next available channel number with respect to a channel number N (step S23). Since as described above the decoder 2 has been already obtained the latest channel information contained periodically in a broadcasting signal including a plurality of channels, the latest information can be obtained from the decoder 2 in step S23.

In step S25, the controller 1 updates the channel table stored in the RAM 7 by using the channel information obtained in step S23. FIG. 2B shows an example of an updated channel table created by updating the channel table shown in FIG. 2A using the channel information obtained in step S23, The case of N=1 is considered. If an available channel number next to the channel N (N=1) is a channel 4, the controller 1 deletes the channel 2 in the channel table and adds the channel 4 as an available channel in the channel table. Thus, the updated channel table shown in FIG. 2B is created.

Next, the controller 1 assigns the channel number obtained in step S23 to the channel number N. If a next available channel number obtained in step S23 is channel 4, the number 4 is assigned to the channel number N. Then, control returns to step S3. As long as a further user selection operation is not performed, the above mentioned updating (S17:NO, S23, S25, and S27) is performed repeatedly.

It is understood that an available channel in the channel table is updated each time a sequence updating steps S23, S25 and S27 is executed. Therefore, an excessive load is not applied to the controller 1. As a result, it becomes possible to keep the channel table up to data while enabling th receiver 10 to immediately respond to a user selection operation.

In this embodiment only one available channel is updated in a sequence of steps S23, S24 and S25. However, two or more available channels may be updated in a sequence of steps S23, S24 ad S25 if time or a burden for updating the channel table for one channel is relatively small.

As described above, according to the embodiment of the invention, a channel number selected by a user is displayed on the display even if the decoder is in the busy mode, and the channel be displayed is received immediately after the busy state is finished. Therefore, usability of the receiver is enhanced while keeping the channel table up to date.

Although the present invention has been described in considerable detail with reference to certain preferred embodiments thereof, other embodiments are possible.

In the above mentioned embodiment, the receiver 10 is configured to receive digital broadcasting including a plurality of channels in a single frequency. Applications of the receiver according to the embodiment of the invention need not be limited to such a digital broadcasting standard. For example, the present invention may applied to digital broadcasting including a plurality of frequencies each of which has a plurality of channels.

The digital broadcasting that the receiver 1 receives may be digital audio broadcasting or digital video broadcasting. In the case of the digital video broadcasting, a period of time for which the decoder 2 stays in a channel setting mode for one channel may become longer. Therefore, the present invention can provide more excellent advantages to a receiver which receives the digital video broadcasting.

The present invention may be applied to a receiver for receiving digital broadcasting including only one channel in a single frequency. In such a case, the table updating process may be conducted as follows. That is, if it is determined in step S17 that the flag is not ON, the controller 1 executes the following process in place of the above mentioned step S23.

The controller 1 instructs the decoder 2 to judge whether or not a signal being received is in a so-called guard interval period. If it is judged that the signal being received is in the guard interval period, the controller 1 instructs the decoder 2 to receive a broadcasting signal of another frequency (which is different from a frequency currently received) so as to obtain channel information of another frequency. Then, steps from S25 are executed. It is understood that in this case the advantage of the above mentioned embodiment is also attained.

The channel table may have additional information. As an example of additional information, in FIG. 2 and 2B, information concerning contents of a channels is contained in the table in a with a table number. The information concerning contents of a channel includes a name of a song name and an artist name. If the channel table contains the information concerning contents of a channel, the controller 1 may additionally obtain the information of channel contents in step S7, and displayed the information of channel contents on the display unit 6 in step S9. In such a case, a user can perform a channel selection operation while viewing information of channel contents on the display unit 6, which enhances usability of a receiver.

The controller 1 may update information of channel contents when updating an available channel number in the channel table. For example, as shown in FIGs. 2A and 2B, information of channel contents of the channel 4 is updated from "CCCC" to "HHHH".

In the above mentioned embodiment, a RAM is used to store the channel table. Alternatively, a nonvolatile memory such as an EEPROM (electrically erasable programmable ROM) may be used to store the channel table. If such a nonvolatile memory is used, the channel table in the memory is not lost by power-down. Therefore, when power of the receiver is turned ON again, the controller 1 can use the channel table stored in the nonvolatile memory as an initial channel table. Therefore, the controller 1 is not required to inquire the channel table from the decoder 2 immediately after power of the receiver is turned to ON.

It should be noted that the present invention can also be applied to a broadcast receiver configured to receive a digitalized ground-based broadcast as well as a digitalized satellite broadcast.

The present disclosure relates to the subject matter contained in Japanese Patent Application No. 2004-091021, filed on Mar. 26, 2004, which is expressly incorporated herein by reference in its entirety.

What is claimed is:

1. A receiving device for digital broadcasting, comprising:
    a receiving system that receives a digital broadcast wave and obtains digital data based on the received digital broadcast wave;
    a memory that is used to store channel information regarding available channels of the digital broadcast wave;
    a display on which information regarding a channel is displayed;
    an operation unit that is operated by a user for a channel selection operation; and
    a controller that operates to obtain identification information, which corresponds to a channel selected by the user, from the channel information when the channel selection operation is performed by the user, operates to display the obtained identification information on the display regardless whether or not the receiving system is in a busy state, and then operates to judge whether or not the receiving system is in the busy state to instruct the receiving system to receive a channel corresponding to the obtained identification information if the receiving system is not in the busy state.

2. The receiving device for digital broadcasting according to claim 1, further comprising a channel information updating system that updates, at a predetermined time, the channel information stored in the memory based on the digital data obtained by the receiving system.

3. The receiving device for digital broadcasting according to claim 1, wherein:
    the digital broadcast wave is configured to include a plurality of channels in a single frequency; and
    the digital data obtained by the receiving system includes the channel information regarding the plurality of channels in the received digital broadcast wave.

4. The receiving device for digital broadcasting according to claim 2, wherein the channel information updating system operates to update the channel information in the memory if the channel selection operation is not performed by the user and the receiving system is not in the busy state.

5. The receiving device for digital broadcasting according to claim 4,
    wherein the channel information updating system operates to repeatedly judge whether the channel selection operation is not performed by the user and the receiving system is not in the busy state, and operates to update the channel information with regard to a predetermined number of channels if it is judged that the channel selection operation is not performed by the user and the receiving system is not in the busy state.

6. The receiving device for digital broadcasting according to claim 2, wherein:
    the digital broadcast wave is configured to include a plurality of channels in a plurality of frequencies, respectively;
    the receiving system operates to detect a guard interval period in the digital broadcast waves; and
    the channel information updating system instructs the receiving system to make a search for channels having frequencies other than a frequency currently received during the guard interval period so as to update the channel information in the memory base on a result of the search.

7. The receiving device for digital broadcasting according to claim 1, wherein the memory is a RAM.

8. The receiving device for digital broadcasting according to claim 1, wherein the channel information is stored in the memory as a table containing an available channel number.

9. The receiving device for digital broadcasting according to claim 8,
wherein the table includes data concerning contents of the available channel number.

10. The receiving device for digital broadcasting to claim 1,
wherein the operation unit is configured to accept an operation for incrementing a channel number to be selected and an operation for decrementing a channel number to be selected.

11. The receiving device for digital broadcasting according to claim 1,
wherein the digital broadcast wave is a digital broadcast provided by broadcast satellites.

12. A method of setting channels in a device for digital broadcasting, comprising the steps of:
detecting a channel selection operation through use of an operation unit;
obtaining identification information, which corresponds to a channel selected by the channel selection operation, from channel information obtained by a receiving unit when the channel selection operation is detected;
displaying the obtained identification information on a display regardless whether or not the receiving unit is in a busy state;
judging whether or not the receiving unit is in the busy state; and
instructing the receiving unit to receive a channel corresponding to the obtained identification information if it is judged that the receiving unit is not in the busy state.

13. The method according to claim 12, further comprising:
updating at a predetermined time, the channel information based on digital data obtained by the receiving unit.

14. The method according to claim 13,
wherein the step of updating is conducted if the channel selection operation is not detected and the receiving unit is not in the busy state.

15. A computer including a computer recordable medium storing the program for use on a receiving device for digital broadcasting, the computer comprising a computer program to achieve a method of setting channels in the receiving device, comprising the executed steps of:
detecting a channel selection operation through use of an operation unit;
obtaining identification information, which corresponds to a channel selected by the channel selection operation, from channel information obtained by a receiving unit when the channel selection operation is detected;
displaying the obtained identification information on a display regardless whether or not the receiving unit is in a busy state; judging whether or not the receiving unit is in the busy state; and instructing the receiving unit to receive a channel corresponding to the obtained identification information if it is judged that the receiving unit is not in the busy state.

16. The computer including a computer recordable medium storing the program according to claim 15, wherein the method further comprising:
updating at a predetermined time, the channel information based on digital data obtained by the receiving unit.

17. The computer including a computer recordable medium storing the program according to claim 16, wherein the step of updating is conducted if the channels section operation is not detected and the receiving unit is not in the busy state.

* * * * *